United States Patent [19]

Horne

[11] 4,258,082

[45] Mar. 24, 1981

[54] MINIMIZING EVAPORATIVE LOSSES FROM FUEL TANKS

[76] Inventor: David H. Horne, 2229 Laird Way, Salt Lake City, Utah 84108

[21] Appl. No.: 20,067

[22] Filed: Mar. 13, 1979

[51] Int. Cl.³ .............................................. B05B 5/00
[52] U.S. Cl. ............................. 427/160; 220/85 VS; 280/5 A; 280/5 G
[58] Field of Search ............... 427/160; 428/920, 913; 220/88 R, 1 V, 1 B, 85 VS; 280/5 G, 5 A

[56] References Cited

U.S. PATENT DOCUMENTS

| | | | |
|---|---|---|---|
| 2,389,579 | 11/1945 | Reynolds | 280/5 R |
| 3,708,330 | 1/1973 | Harr | 280/5 R |
| 3,991,254 | 11/1976 | Takeuchi | 428/310 |
| 4,054,711 | 10/1977 | Botsolas | 428/920 |
| 4,104,426 | 8/1978 | Gonzales et al. | 428/920 |
| 4,141,460 | 2/1979 | Stanistreet et al. | 428/920 |

FOREIGN PATENT DOCUMENTS 51-41079 10/1974 Japan ...................................... 427/160

OTHER PUBLICATIONS

Knanishu, J., *Heat and Light Reflective Coatings*, U.S. Arsenal, Rock Island, Ill., Lab., p. 1.
Sandler, M., *Heat Reflective and Insulating Coatings for Rocket Motors*, Proving Grounds, Aberdeen, Md., pp. 1 and 2.

*Primary Examiner*—Ronald H. Smith
*Assistant Examiner*—Janyce A. Bell
*Attorney, Agent, or Firm*—Terry M. Crellin

[57] ABSTRACT

A method is disclosed for minimizing evaporative losses of liquid hydrocarbon fuels from fuel tanks installed on motor vehicles wherein the fuel tanks are shielded from sources of heat which would otherwise cause significant evaporation of the hydrocarbon fuel contained therein. The shielding is achieved by covering the surfaces of the fuel tanks which are exposed to radiation and convection from hot pavement, reflected solar radiation, and direct solar radiation with a heat insulating and radiation reflection coating.

1 Claim, No Drawings

MINIMIZING EVAPORATIVE LOSSES FROM FUEL TANKS

BACKGROUND OF THE INVENTION

1. Field

The invention pertains to systems and methods of minimizing evaporative losses of liquid hydrocarbon fuels from fuel tanks installed on motor vehicles.

2. State of the Art

Asphalt pavement can become considerably hot, up to temperatures of 130° F. to 150° F. during a summer day. The hot, black asphalt transfers heat to all vehicles passing over the pavement. The fuel tanks on the vehicles are customarily installed on the undercarriage of the vehicle, and the surfaces of the fuel tanks which face the pavement receive heat from the pavement by radiation and convection. The same surfaces of the tanks also receive reflected solar radiation from the pavement. As heat is transferred to the fuel tank, the fuel is heated and evaporation increases.

Various systems of venting evaporized fuel have been developed in the prior art and incorporated on motor vehicles. Included among these venting systems are vented tank caps, vents directly to the atmosphere at the top of the tanks, and vents from the top of the tanks to vapor condensation chambers, the carburetor, or vapor absorbtion canisters. The use of fuel tanks which are made to withstand a slight pressure has been used sparingly. The reason pressurized fuel systems have not been utilized more extensively is because they are very ineffective due to the high vapor pressures of the hydrocarbons in the fuel. To be effective, at least with respect to reducing vapor losses, the fuel tank and related system would have to withstand pressures of 35 psi gage or greater.

Fuel vapor storage canisters have been used recently. They are designed to capture and store fuel vapors that escape from the fuel tank while the engine is not in operation. Theoretically, the vapors are to be absorbed on a porous media in the canister. The condensed vapors are to be drawn into the carburetor during subsequent operation of the engine. Unfortunately, however, the capacity of the canisters is much smaller than the amount of vapors which are generated during a typical hot, summer day.

3. Objectives

The principal objective of the present invention is to provide a method of minimizing evaporative losses of liquid fuels from fuel tanks installed on motor vehicles. In particular, it is an objective of this invention to provide a method of effectively minimizing the amount of vaporization occuring within the fuel tanks rather than attempting to recover the unmanageable vapors after they have been generated.

SUMMARY OF THE INVENTION

The above objective is achieved in accordance with the present invention by shielding the surfaces of the fuel tanks which are exposed to radiation and convection from hot pavement, reflected solar radiation, and direct solar radiation. These surfaces of the fuel tanks are covered with a heat insulating and radiation reflecting coating. The coating is advantageously a low heat conductivity paint having a high reflectivity. In addition, the heat insulating and radiation reflecting coating can be a member selected from the group consisting of fiberglass, mineral wool, asbestos, rubber, polymeric materials, resins, and other insulating materials.

The other surfaces of the tanks, i.e., the surfaces which are not subject to radiation and conduction from the pavement or reflected solar radiation is left uninsulated so as to promote as much heat dissipation as possible from these surfaces. To further promote heat dissipation from the fuel tanks, fins can be placed either on the inside or outside of the sides or surfaces of the tanks which are not subject to radiation and conduction from the pavement or reflected solar radiation.

DETAILED DESCRIPTION OF THE PREFERRED EMBODIMENTS

As mentioned hereinbefore, the principal objective of the present invention is to minimize the evaporative loss of liquid fuels from tanks installed on motor vehicles. This is accomplished by shielding selected areas on the tanks for inhibiting heat transferred to the fuel tanks. The selected areas are shielded from heat transfer modes including conduction and radiation from hot pavement, exhaust pipes, etc., as well as direct and reflected solar radiation.

The areas of the fuel tanks which are shielded in accordance with the present invention are those which are exposed to radiation and convection from hot pavement, and other sources of heat such as exhaust pipes and mufflers, as well as areas receiving reflected solar and direct solar radiation. The areas of the tanks subject to direct solar radiation, to reflected solar radiation, or to direct thermal radiation from the pavement are those areas of the tanks which are visable from a horizontal or higher view of the vehicle from the sides, front, and back, as well as the areas of the tanks which can be seen from the pavement.

The shielding comprises a coating of a heat insulating and radiation reflecting material. In a preferred embodiment, the selected areas of the fuel tanks are coated with a high reflectivity, low heat conductivity paint such as the paint marketed by Eagle-Picher Industries under the trademark CHEM-SHIELD 1503R, which has a heat conductivity of only 0.11 BTU/°F./Hr/sq.ft. The paint coating is applied in a thickness of from 1 mil to about 500 mil, preferably from about 25 to 100 mil. Other heat insulating, high reflectivity coatings made from polymeric and elastomeric materials can be used, including coatings made of polyurethane, vinyl, acrylic, and alkyd components. The coatings can be in the form of foamed polymeric and elastomeric materials, in which case an overcoat of a waterproof coating is advisable to prevent moisture and salt absorption into the insulation. One foam insulation system which can advantageously be used is marketed by Owens Corning under the tradename Fiberglas Urethane Tank Insulation Spray System 352.

A solid insulation material, such as fiberglass, mineral wool, asbestos, rubber, polymeric materials, or other thermal insulation material, can be applied to the selected areas of the tank. A shield, such as metal or other composition cover is applied to the insulation material to prevent water absorption or collection of dust, sand or other foreign matter from the road. The shield is then painted with a material having a high reflectivity paint to provide the reflectivity needed for the composite insulation. The reflectivity of the insulative coating, whether a single paint system or a composite system should be at least about 0.9 or greater.

The other areas of the fuel tanks are left uninsulated so as to dissipate as much heat as possible from the tanks. The heat dissipation from the tanks can be increased by providing fins on the interior and/or the exterior of the areas of the tanks which are left uninsulated. The fins greatly increase the overall thermal conductivity of these areas.

I claim:

1. A method for minimizing evaporative losses of liquid hydrocarbon fuels from fuel tanks installed on motor vehicles, wherein the fuel tank is positioned on the underneath portion of the body of the vehicles, said method comprising covering the surfaces of the fuel tanks which are exposed to radiation and convection from hot pavement, reflected solar radiation, and direct solar radiation with a heat insulating and radiation reflecting coating of a low heat conductivity paint having a high reflectivity, while the surfaces of the tanks which are not subject to radiation and conduction from the pavement or from reflected solar radiation are left uninsulated so as to promote as much heat dissipation as possible therefrom.

* * * * *